United States Patent [19]

Yoshimura

[11] 4,094,489

[45] June 13, 1978

[54] SEAT POSITION ADJUSTING MEANS FOR AUTOMOBILE SEAT ASSEMBLIES

[75] Inventor: Noboru Yoshimura, Toyota, Japan

[73] Assignee: Aisin Seiki Kabushiki Kaisha, Kariya, Japan

[21] Appl. No.: 745,976

[22] Filed: Nov. 29, 1976

[30] Foreign Application Priority Data

Dec. 9, 1975  Japan .................. 50-146730

[51] Int. Cl.² ............................................. F16M 13/00
[52] U.S. Cl. ..................................... 248/429; 297/344
[58] Field of Search ..................... 248/424, 429, 430; 297/344, 337

[56] References Cited

U.S. PATENT DOCUMENTS

| 1,700,308 | 1/1929 | Chilson et al. | 248/429 |
| 2,308,714 | 1/1943 | Ralston | 297/344 X |
| 3,013,763 | 12/1961 | Weberman | 248/429 |

Primary Examiner—James C. Mitchell
Attorney, Agent, or Firm—Finnegan, Henderson, Farabow & Garrett

[57] ABSTRACT

In an automobile seat assembly comprising a rail provided on a body floor, a bracket slidably mounted on the rail and carrying a seat, a pair of locking elements mounted on the bracket and resiliently biased into locking engagement with the rail, an adjusting lever mounted on the bracket for swinging movement about an axis, and a pair of outrigger elements mounted on said lever for swinging movement about a second axis. Actuation of the lever in one direction causes disengagement of one of the locking elements and one of the outrigger elements from the rail, the other outrigger element functioning as a fulcrum member for supporting the second axis against displacement whereby the first axis and therefore the bracket are displaced with respect to the rail.

6 Claims, 6 Drawing Figures

SEAT POSITION ADJUSTING MEANS FOR AUTOMOBILE SEAT ASSEMBLIES

The present invention relates to seats for automobiles and, more particularly, to automobile seats which are adjustable in longitudinal positions.

In automobiles, it is common to mount seats longitudinally slidable on automobile floors. For this purpose, the seats are mounted on longitudinally directed guide rails for slidable movement thereon and means is provided for locking the seats on the rails at desired positions. For adjustment of the position of the seat, it is required first to unlock the seat from the rails, then to apply external force to the seat to cause it to move in a desired direction and thereafter lock the seat again to the rails. Such locking and unlocking of the seat are usually performed through actuation of a locking lever provided for this purpose on the seat, and the external force for effecting movement of the seat is applied manually by the operator.

Such conventional arrangements have been found disadvantageous in that difficulties have been experienced in making such seat position adjustments when the automobile is under operation. When the automobile is running, the seat may be subjected to inertial forces so that unlocking of the seat from the seat rails may cause movement of the seat in an undesired direction or the seat may be excessively moved beyond a desired position. Thus, the conventional arrangements are not suitable in performing seat position adjustment when the automobile is running and, if performed under such condition, may be accompanied with a danger of accident.

The present invention has therefor as an object to provide a novel arrangement for enabling adjustment of seat positions in an automobile.

Another object of the present invention is to provide automobile seat position adjusting means which can be safely used even when the automobile is under operation.

A further object of the present invention is to provide automobile seat position adjusting means which can effect movement of the seat in a direction by a predetermined distance through a clockwise movement of an adjusting lever, a counterclockwise movement of the adjusting lever in the other direction causing movement of the seat in the opposite direction.

A further object of the present invention is to provide automobile seat position adjusting means including means for enabling free movement of the seat in one direction through application of external force to the seat when the swinging movement of the lever in one direction is terminated.

Yet another object of the present invention is to provide automobile seat position adjusting means including an adjusting lever which is utilized to produce a seat position adjusting movement through actuation of the lever, said adjusting means further including means for simply unlocking the seat for slidable movement so that the position of the seat can be adjusted through application of external force in a conventional manner.

According to the present invention, the above and other objects can be accomplished in an automobile seat assembly comprising rail means provided on an automobile body floor, seat means having bracket means slidable along said rail means, adjusting means which comprises swingable adjusting lever means mounted on said seat means, means associated with said lever means for unlocking the bracket means upon actuation of said lever means and for producing a movement of the seat means along said rail means by a predetermined distance in a direction which is dependent on the direction of actuation of said lever means.

In a specific mode of the present invention, the rail means is formed with a plurality of recesses which are arranged in at least one row, and said locking means includes locking elements which are biased into locking engagement with said recesses and moved out of such locking engagement upon actuation of the lever means. There is further provided outrigger elements which are swingably mounted on the lever means at a position offset from the position at which the lever means is mounted on the rail bracket means. The outrigger elements are also spring biased into engagement with one of the recesses, so that, when the lever is swingably actuated in one direction and one of the locking elements is moved out of locking engagement with the recess in the rail means, the lever means is caused to swing about the position where the outrigger elements are mounted on the lever means with the result that the rail bracket means on the seat means is displaced with respect to the rail means.

In a preferred mode of the present invention, a pair of such locking elements and a pair of outrigger elements are provided in such a manner that one of the locking elements and one of the outrigger elements are simultaneously moved out of engagement with the recesses in the rail means when the adjusting lever means is actuated in one direction and that the other outrigger element serves to produce a reaction force for displacing the seat in one direction, the other of the locking elements and the recesses being so shaped that it does not resist the movement of the seat in said direction. Means also may be provided for simultaneously moving the locking elements and the outrigger elements out of engagement with the recesses in the rail means so that the seat means becomes free for sliding adjustment under an external force which may be applied manually.

The above and other objects and features of the present invention will become apparent from the following description of a preferred embodiment taking reference to the accompanying drawings, in which.

Figure 1:
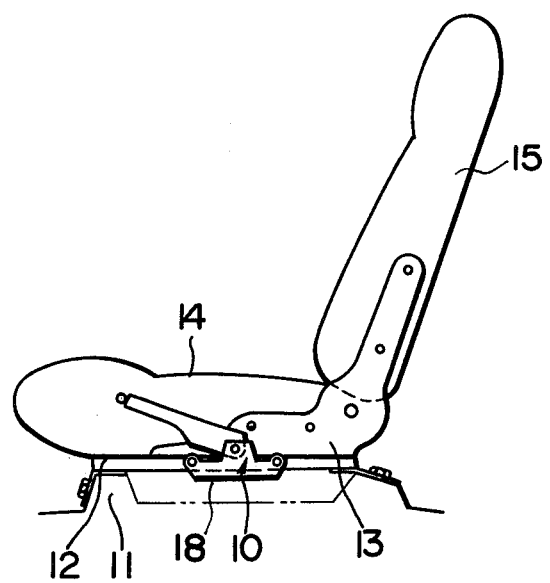
FIG. 1 is a schematic side view of a seat assembly for automobiles embodying the features of the present invention.

Referring now to the drawings, particularly to FIG. 1, the automobile seat assembly shown therein comprises a pair of parallel rails 12 although only one is shown in FIG. 1. The rails 12 are secured to the floor 11 of the automobile body as in conventional arrangements. A seat bracket 13 carrying a seat 14 and a back rest 15 is mounted on the rails 12 through a seat position adjusting mechanism 10.

Figure 2:
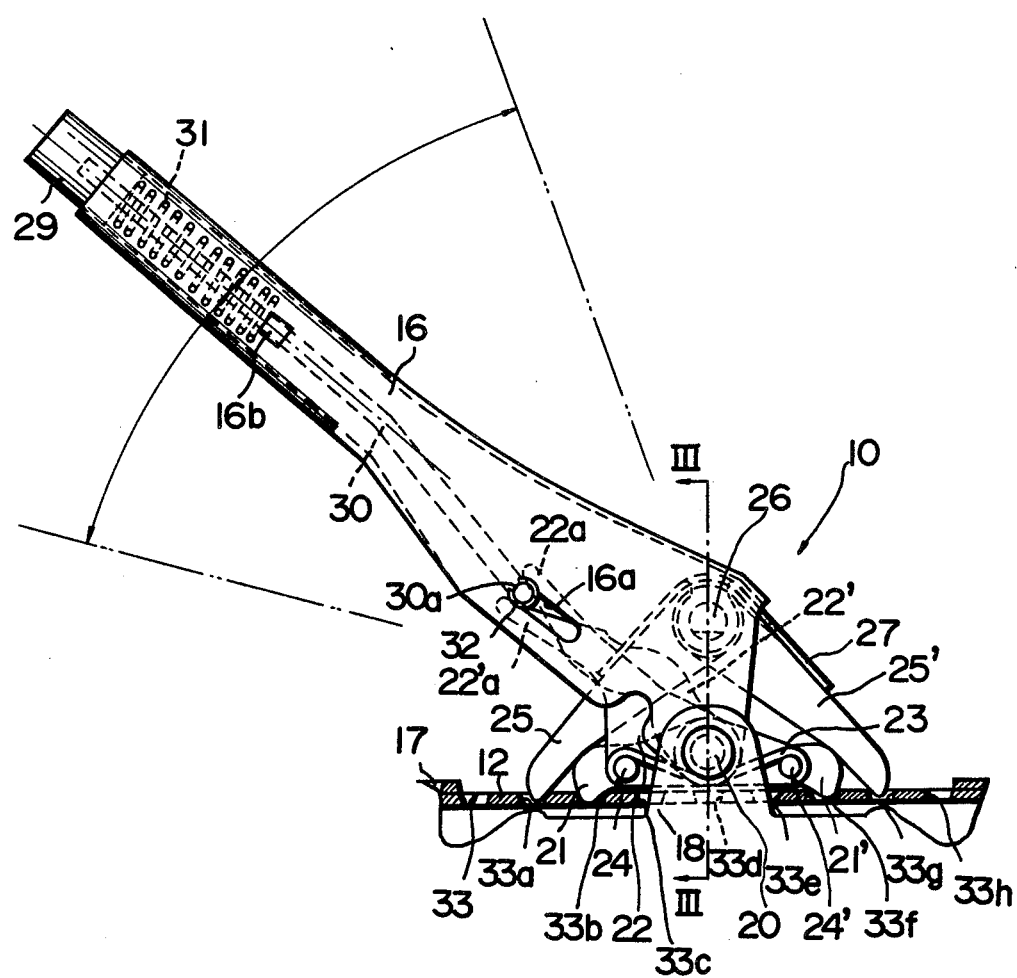
FIG. 2 is an enlarged side view showing details of a seat position adjusting mechanism in accordance with one embodiment of the present invention.
Figure 3:
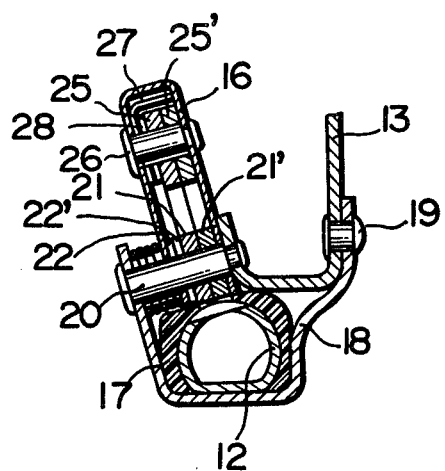
FIG. 3 is a sectional view taken substantially along the line III—III in FIG. 2.

Referring to FIGS. 2 and 3, the seat position adjusting mechanism 10 includes a rail bracket 18 which may be secured to the seat bracket 13 through suitable means such as rivets 19. The rail bracket 18 has a slidable member 17 which is secured to the bracket 18 and slidably engaged with the rail 12.

An adjusting lever 16 is mounted on the rail bracket 18 by means of a shaft 20 extending between the brackets 13 and 18 as clearly shown in FIG. 3 so that the lever 16 is swingable about the shaft 20. The shaft 20 further carries a pair of locking elements 21 and 21' and a pair of releasing levers 22 and 22' which are also swingable about the shaft 20. The locking element 21 and the releasing lever 22 are interconnected with each other by means of a pin 24 extending through the element 21 and the lever 22. Similarly, the locking element 21' is interconnected with the releasing lever 22' by means of a pin 24'. A torsion spring 23 provided around the shaft 20 has one end engaged with the pin 24 and the other end with the pin 24' so that the locking elements 21 and 21' are spring biased toward the rail 12.

The rail 12 is formed with a plurality of recesses or apertures 33 which are arranged in a single row. The locking elements 21 and 21' have free ends which are normally in locking engagements with selected ones of the recesses 33 such as those designated by the references 33b and 33f. As seen in FIG. 2, the free end of the locking element 21 has a relatively steep or vertical edge at the left side but a slanted edge at the right side. Thus, the locking element 21 provides a resistance to a leftward movement of the rail bracket 18 but can be easily disengaged from the recess 33b. Similarly, the locking element 21' provides a resistance only to the rightward movement of the rail bracket 18.

The adjusting lever 16 further carries a pair of outrigger elements 25 and 25' which are swingably mounted thereon by means of a shaft 26 at a position vertically offset from the shaft 20 which mounts the lever 16 on the rail bracket 18. The outrigger elements 25 and 25' are associated with a leaf spring 27 which biases the elements 25 and 25' into engagement with selected ones of the recesses 33 in the rail 12, such as those shown by the reference numerals 33a and 33g.

The adjusting lever 16 is also provided with a push rod 30 which extends longitudinally in the lever 16 and has an inner end 30a laterally bent to extend through a slot 16a formed in the side wall of the lever 16. A C-shaped ring 32 is attached to the end 30a so as to hold it in the slot 16a. The push rod 30 has an outer end to which a push button 29 is secured. A compression spring 31 is disposed to act between the push button 29 and a spring retainer 16b provided on the lever, so that the push rod is spring biased in such a direction that the push button 29 is forced outwardly.

The release levers 22 and 22' have free ends 22a and 22'a which are in contact engagement with the laterally bent end position 30a of the push rod 30 in such a manner that, when the lever 16 is swingably moved clockwise as seen in FIG. 2, the releasing lever 22 is also caused to swing about the shaft 20 and, when the lever 16 is swung in the opposite direction, the other releasing lever 22' is swingably moved.

The ends 22a and 22'a of the releasing levers 22 and 22' have slanted cam edges for contact engagement with the end portion 30a as seen in FIG. 2 so that, when the push button 29 is actuated to force the push rod 30 inwardly, the release levers 22 and 22' are simultaneously swung in opposite directions.

In the normal position shown in FIG. 2, the outrigger elements 25 and 25' are in contact with the locking elements 21 and 21', respectively, so that any unlocking movement of the locking element 21 or 21' causes disengagement of the associated outrigger element 25 or 25' from the recess 33 in the rail 12.

Thus, in order to move the seat bracket 13 carrying the seat 14 with respect to the rail 12, by the predetermined distance, the adjusting lever 16 is actuated to swing about the shaft 20 in either of the clockwise or counter-clockwise direction. When the lever 16 is swung counter-clockwise as seen in FIG. 2, the releasing lever 22' is forced to swing counter-clockwise by the end portion 30a of the push rod 30 which is in contact engagement with the end portion 22'a of the releasing lever 22'. Thus, the locking element 21' is also swung counter-clockwise to be disengaged from the recess 33 in the rail 12. Since the locking element 21' is in contact engagement with the outrigger element 25', the counter-clockwise movement of the locking element 21' also causes a counter-clockwise swinging movement of the outrigger element 25' whereby the element 25' is disengaged from the recess 33 of the rail 12.

In the initial stage of the counter-clockwise actuation of the adjusting lever 16, as the lever 16 is rotated about the shaft 20, the outrigger element 25 is forced into position engagement with one, such as 33a, of the recesses 33 in the rail 12 and, throughout a further counter-clockwise actuation of the adjusting lever 16, the outrigger element 25 functions as a reaction or fulcrum member, whereby the further counter-clockwise actuation of the lever 16 produces a swinging movement of the lever 16 about the shaft 26 but not about the shaft 20. Thus, the shaft 20 is displaced toward the right with respect to the rail 12 producing a corresponding rightward movement of the rail bracket 18 and the seat bracket 13. As previously described, the locking element 21 does not provide any resistance to the rightward movement of the rail bracket 18. In this manner, the seat 14 is moved right as seen in FIG. 2, which direction may be rearwards in the illustrated embodiment in FIG. 5.

Figure 5:
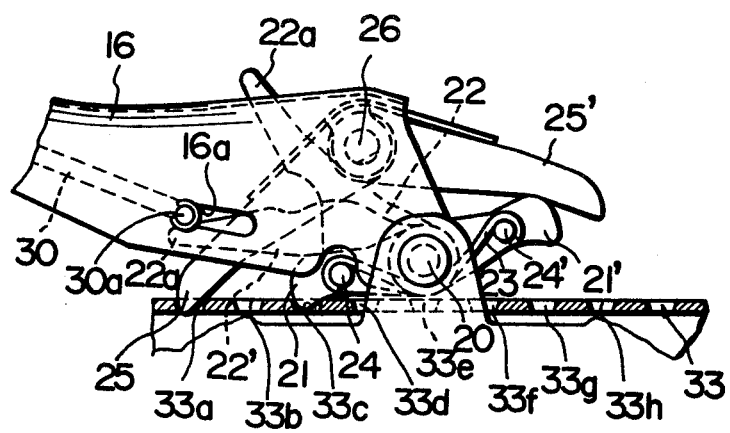
Figure 6:
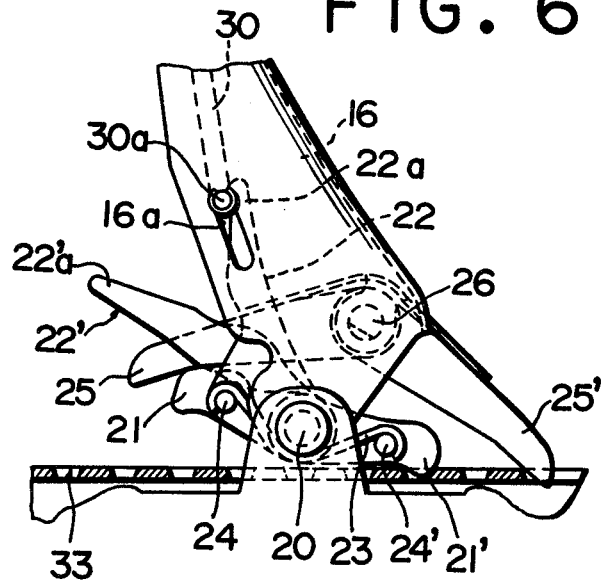

When the adjusting lever 16 is returned from the position shown in FIG. 5 to the inertia or neutral position, it is rotated about the shaft 20 but not about the shaft 26 because there is no reaction or fulcrum member for supporting the shaft 26 against displacement. Therefore, the releasing lever 22' and thus the locking element 21' are allowed to rotate clockwise under the influence of the torsion spring 23 by which the rail bracket 18 is maintained in the displaced position until the locking element 21' engages with a recess 33g which is adjacent to the recess 33f with which the element 21' had previously been in engagement. As the locking element 21' is allowed to be moved clockwise under the influence of the spring 23, the outrigger element 25' is also allowed to move clockwise under the influence of the leaf spring 27 until it engages with a recess 33h which is adjacent to the recess 33f with which the element 25' had previously been in engagement. Thus, all of the parts in the adjusting mechanism 10 are returned to the positions shown in FIG. 2 but the rail bracket 18 is displaced toward the right by a distance corresponding to the distance between two adjacent recesses 33 in the rail 12.

When the adjusting lever 16 is swingably moved clockwise from the normal or neutral position shown in FIG. 2, the lever 16 is at first rotated or swung about the shaft 20 until the outrigger element 25' positively engages one, such as 33g, of the recesses 33 in the rail 12. In this initial stage of actuation of the lever 16, the locking element 21 and the outrigger element 25 are moved out of engagement with the recesses 33 of the rail 12. A further clockwise actuation of the lever 16 causes a clockwise movement of the lever 16 about the shaft 26 to move leftward the rail bracket 18 and the seat bracket 13 in a manner quite similar to that which was produced when the lever 16 was actuated counter-clockwise.

Further, the seat position adjusting means for automobile seat assemblies according to the present invention can provide free movement of the seat through application of an external force to the seat. For example, when the lever 16 is rotated counter-clockwise as viewed in FIG. 2 so as to produce the swinging movement of the lever 16 about the shaft 26, the locking element 21 does not provide any resistance to the rightward movement of the rail bracket 18, as previously described. Thus, application of an external force to the seat causes the seat to move rightward by the desired distance if the adjusting lever 16 is not returned from the position shown in FIG. 5 to the neutral position shown in FIG. 2. Also, it is understood that when the adjusting lever is rotated clockwise as seen in FIG. 2 and the locking element 21' does not provide any resistance to the leftward movement of the rail bracket 18, application of an external force to the seat, before the lever 16 is returned to the neutral position as shown in FIG. 2, can produce free movement of the seat in a leftward direction.

Figure 4:
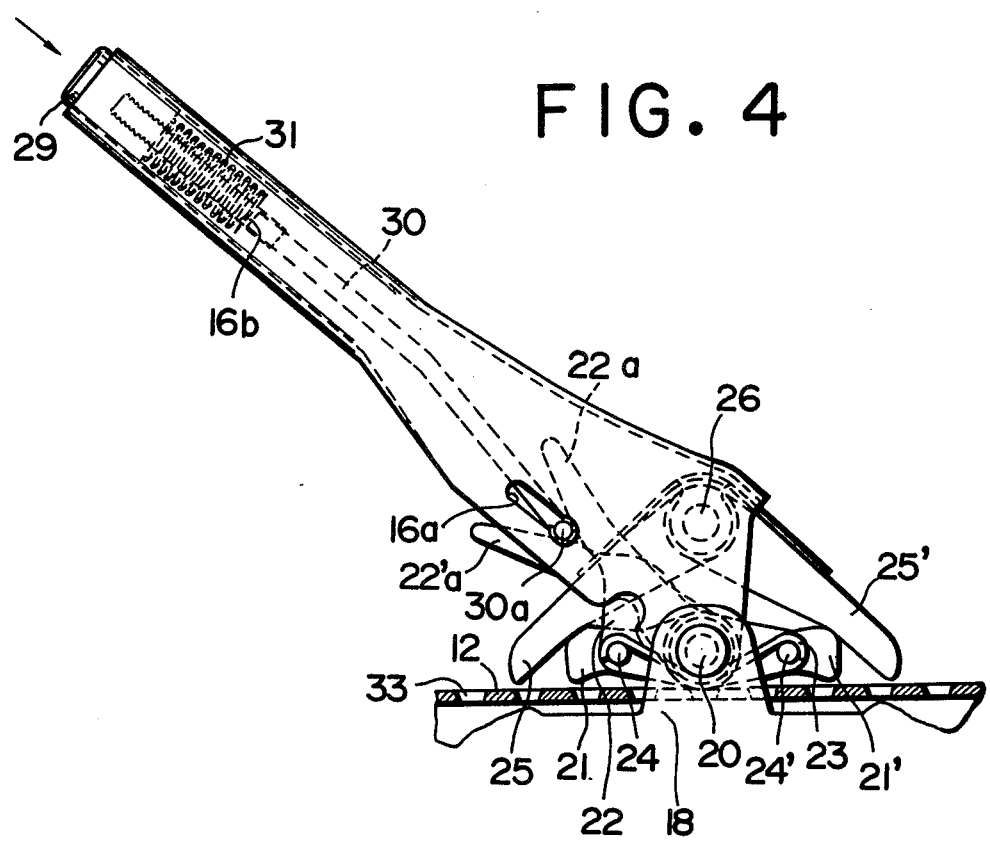
FIG. 4 is a side view similar to FIG. 2 but showing one mode of operation of the mechanism, wherein all of the locking elements and the outrigger elements are moved out of engagement with the rail for allowing free slidable movement of the seats; and, FIGS. 5 and 6 are fragmentary side views of the seat position adjusting mechanism showing the other mode of operation of the mechanism.

Further, when the push button 29 is actuated to force the push rod 30 axially inward, the releasing lever 22 is caused to swing clockwise to move the locking element 21 in the same direction. At the same time, the releasing lever 22' is swingably moved counter-clockwise to move the associated locking element 21' in the same direction. Thus, both of the locking elements 21 and 21' are simultaneously disengaged from the recesses 33 in the rail 12 and, as described above, such disengagement of the locking elements 21 and 21' also causes disengagement of the outrigger elements 25 and 25' from the recesses 33 in the rail 12 as shown in FIG. 4. Thus, the seat is unlocked from the rail 12 and can be moved freely along the rail 12 in any direction depending on the direction of an external force as in conventional arrangements.

From the above description, it will be understood that the seat position adjusting mechanism 10 can provide a stepwise adjustment of the seat position through a simple actuation of the swingable lever 16. It should further be noted that, in the mechanism 10, the seat can be displaced along the seat rail 12 under an external force.

The invention has thus been shown and described with respect to a specific embodiment, however, it should be noted that the invention is in no way limited to the detail of the illustrated structures but changes and modifications may be made without departing from the scope of the appended claims.

I claim:

1. Seat position adjusting means for an automobile seat assembly, which comprises rail means provided on a floor of an automobile body and having a plurality of recesses arranged at least in one row, bracket means slidable along said rail means and carrying seat means thereon, locking means provided on said bracket means and including locking elements which are resiliently biased into locking engagement with said recesses in said rail means, adjusting lever means mounted on said bracket means for swinging movement about a first axis, means for interconnecting said adjusting lever means with said locking elements in such a manner that at least one of the locking elements is moved out of engagement from one of the recesses in the rail means when said lever means is swingably actuated in at least one direction, and outrigger elements mounted on said lever means for swinging movement about a second axis which is offset from said first axis, said outrigger elements being resiliently biased into engagement with another of said recesses in the rail means whereby, when said lever means is actuated to disengage said one of the locking elements from said one of said recesses in the rail means, one of the outrigger elements functions as a fulcrum member for supporting said second axis against displacement so as to cause a predetermined displacement of the first axis with respect to said rail means for producing a corresponding displacement of the bracket means.

2. Seat position adjusting means in accordance with claim 1 wherein means is further provided for simultaneously disengaging said locking and outrigger elements from the recesses in the rail means for allowing free displacement of said bracket means under an external force.

3. Seat position adjusting means in accordance with claim 1 wherein said locking elements comprise first and second locking elements and said outrigger elements comprise first and second outrigger elements and wherein said first and second locking elements are respectively associated with said first and second outrigger elements in such a manner that, when a locking element is moved out of engagement with a recess of the rail means, the respectively associated outrigger element is also moved out of engagement with the rail means recess.

4. Seat position adjusting means in accordance with claim 3 in which said first locking element is so shaped that it provides a resistance to the displacement of the bracket means only in one direction and the second locking element is so shaped that it provides a resistance to the displacement of the bracket means only in the other direction, whereby said disabling means comprises means for disengaging one of the locking elements when the adjusting lever is actuated in one direction and the other of the locking elements when the adjusting lever is actuated in the other direction.

5. Seat position adjusting means for an automobile seat assembly comprising
rail means provided on an automobile body floor,
bracket means slidably provided along said rail means and carrying seat means thereon,
adjusting lever means swingably mounted on said bracket means about a first pivot means,
locking means provided on said bracket means and resiliently biased into an engaging direction with said rail means, and
outrigger means swingably mounted on said lever means about a second pivot means and resiliently biased into an engaging direction with said rail means, whereby said seat means is moved along said rail means in step-by-step relation by a predetermined distance in a direction depending upon the swinging movement of said adjusting lever means.

6. Seat position adjusting means for an automobile seat assembly according to claim 5 in which said locking means are provided on said bracket means for swinging movement about said first pivot means and said outrigger means are resiliently biased into an engaging direction with said rail means so as to cooperate with said locking means depending upon the swinging movement of said adjusting lever means.

* * * * *